United States Patent [19]

Babrowicz

[11] Patent Number: 5,620,758
[45] Date of Patent: Apr. 15, 1997

[54] MULTILAYER PACKAGING LAMINATE

[75] Inventor: Robert Babrowicz, Spartanburg, S.C.

[73] Assignee: W.R. Grace & Co.-Conn., Duncan, S.C.

[21] Appl. No.: 406,252

[22] Filed: Mar. 10, 1995

Related U.S. Application Data

[63] Continuation of Ser. No. 138,904, Oct. 18, 1993, abandoned.

[51] Int. Cl.$^6$ .............................. B65D 30/08; B32B 13/12
[52] U.S. Cl. ................. 428/35.2; 428/35.4; 428/347; 428/349; 428/447; 428/451; 428/475.8; 428/483; 428/518; 428/520
[58] Field of Search ..................... 428/447, 451, 428/518, 520, 483, 475.8, 35.2, 35.4, 347, 349

[56] References Cited

U.S. PATENT DOCUMENTS

| | | | |
|---|---|---|---|
| 3,741,253 | 6/1973 | Brax et al. | 428/215 |
| 4,400,428 | 8/1983 | Rosenthal et al. | 428/451 |
| 4,502,263 | 3/1985 | Crass et al. | 428/451 |
| 4,734,317 | 3/1988 | Bothe et al. | 428/451 |
| 4,759,992 | 7/1988 | Tomko et al. | 428/451 |
| 4,963,419 | 10/1990 | Lustig et al. | 428/518 |
| 5,041,316 | 8/1991 | Parnell et al. | 428/35.4 |

FOREIGN PATENT DOCUMENTS

4207313A1  9/1993  Germany.

Primary Examiner—Rena Dye
Attorney, Agent, or Firm—Mark B. Quatt

[57] ABSTRACT

The laminate includes a sealable layer, optionally a core layer, an oxygen barrier layer and an abrasion resistant layer. The abrasion resistant layer contains at least 25% of moisture curable polymer and remains firmly adhered to the barrier layer when the sealable layer is sealed to form a package.

14 Claims, 1 Drawing Sheet

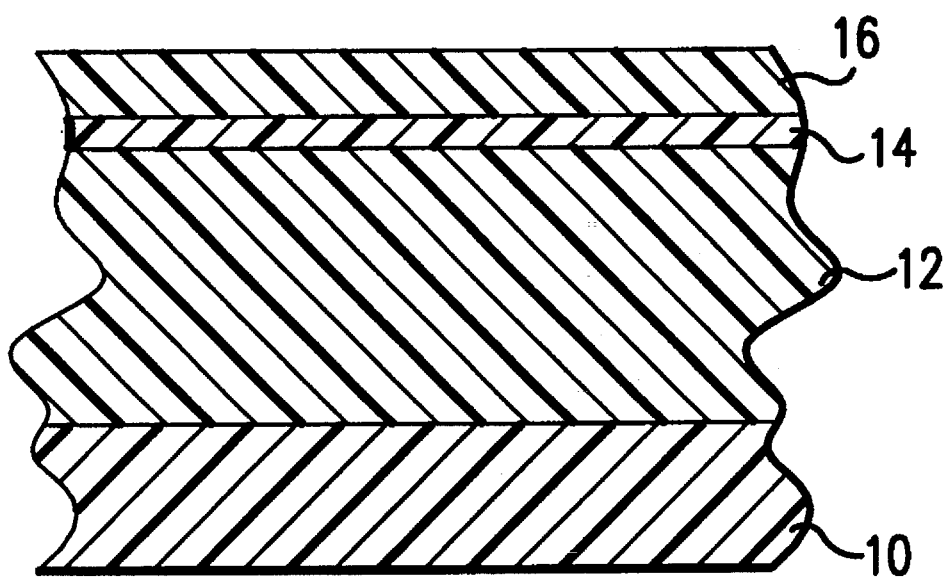

MULTILAYER PACKAGING LAMINATE

This application is a Continuation of application Ser. No. 138,904, filed on Oct. 18, 1993, now abandoned.

BACKGROUND OF THE INVENTION

This invention relates to a multilayer packaging laminate for packaging applications, especially in packaging food products such as barrier bags.

Multilayer plastic laminates are commonly used as packaging materials for food products. These laminates are generally extruded or coextruded and typically include at least four layers of plastic materials. Typically, the inside layer or layer exposed to the food is a seal layer which contacts the food and which may be heat sealed in order to form the packaged product.

These multilayer laminates generally contain a core layer bonded to the seal layer; a barrier layer bonded to the core layer, such as saran or ethylene vinyl alcohol copolymer (EVOH) as an oxygen barrier; and an outside or abuse layer bonded thereto. The outside layer is the considered the abuse layer, that is, the out side layer is the exposed layer and should be abrasion resistant while having good optics and having grease resistance.

A problem with these laminates is applied seal delamination. That is, when the inside or seal layer is bonded together to form a heat seal, often the outside or abuse layer will delaminate from the barrier layer which is bonded thereto. It is highly desirable to provide an outside or abuse layer which enjoys the desirable characteristics needed in such a layer while at the same time is not subject to applied seal delamination.

Conventionally, adhesive materials are applied between the barrier layer and the outside layer; however, these do not entirely avoid the problem of applied seal delamination.

Accordingly, it is a principal object of the present invention to provide a multilayer packaging laminate suitable for use in packaging applications which has excellent packaging characteristics.

It is a further object of the present invention to provide a laminate as aforesaid wherein the outside layer is bonded to a barrier layer, is abrasion resistant and does not delaminate from the underlying barrier layer on heat sealing.

Further objects and advantages of the present invention will appear hereinbelow.

SUMMARY OF THE INVENTION

In accordance with the present invention, it has been found that the foregoing objects and advantages are readily obtained.

The multilayer packaging laminate of the present invention comprises: a sealable inside plastic layer; a barrier layer of plastic material adhered to the sealable layer; and an abrasion resistant outside layer of plastic material adhered to the barrier layer; wherein the outside layer contains at least 25% by weight of the outside layer of a moisture curable polymer; and wherein the outside layer remains firmly bonded to the barrier layer when the first layer is sealed to form a package. Two portions of the sealable or first layer are generally heat sealed together to form a package. Preferably, a core layer is provided between the inside and barrier layers and adhered thereto.

"Ethylene alpha olefin copolymer" (EAO) is used here to include such materials as linear low density polyethylene (LLDPE); very low and ultra low density polyethylene (VLDPE and ULDPE); and metallocene catalyzed polymers such as those supplied by Exxon. Tafmer materials supplied by Mitsui are also included. These materials include copolymers of ethylene with one or more comonomers selected from $C_4$ to $C_{10}$ alphaolefins such as butene-1, hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. "LLDPE" as defined here has a density usually in the range of from about 0.916 grams per cubic centimeter to about 0.940 grams per cubic centimeter. Generally, EAO resins include both homogeneous and heterogeneous polymers.

The sealable layer is preferably an ethylene vinyl acetate copolymer (EVA), low density polyethylene (LDPE) or EAO as linear low density polyethylene (LLDPE). The core layer preferably represents the largest portion of the laminate and is preferably EVA, EAO as LLDPE, nylon or a polyester. The barrier layer may be any oxygen barrier, such as saran or EVOH. The outside layer contains at least 25% by weight of a moisture curable polymer and is preferably a silane grafted polyolefin polymer or copolymer as LLDPE, or EVA grafted silane copolymers.

It has been found that the foregoing laminate has desirable characteristics for a packaging laminate and does not suffer from applied seal delamination.

Further advantages and features of the present invention will appear hereinbelow.

BRIEF DESCRIPTION OF THE DRAWING

The invention may be further understood by reference to the drawing herein where:

The Figure is a schematic cross section on an enlarged scale of a preferred embodiment of a multilayer packaging laminate in accordance with the present invention.

DESCRIPTION OF THE PREFERRED EMBODIMENTS

The present invention utilizes moisture curable polymer in the outside or abuse layer of a multilayer packaging laminate wherein the above layer is bonded to a barrier layer, in order to avoid the problem of applied seal delamination wherein the outside layer delaminates from the underlying barrier layer when the laminate is heat sealed.

The multilayer laminate of the present invention is extruded or coextruded and typically contains at least three and generally at least four layers. Thus, as shown in the drawing, reference numeral 10 represents the inside or seal layer, reference numeral 12 represents the core layer bonded to the seal layer, reference numeral 14 represents the barrier layer as an oxygen barrier bonded to the core layer, and reference numeral 16 represents the outside or abuse layer which is the layer containing the moisture curable polymer.

The inside or seal layer 10 is the first layer and is the layer which contacts the food and may be any plastic layer FDA approved for direct food contact. Preferred inside layers ate EVA, LDPE or EAO as LLDPE or blends thereof. In use, one portion of the seal layer is heat sealed to another portion of the seal layer to provide a heat sealed package.

In the preferred embodiment, the second layer 12 bonded to the first layer is the core layer and represents the main portion of the laminate. This layer provides impact strength and puncture resistance in the final package and any plastic layer may be used which provides good impact strength and puncture resistance. Preferred core layers are EVA, EAO as LLDPE, nylon or polyesters.

The third or barrier layer 14 is an oxygen barrier which provides the oxygen barrier resistance of the laminate, desirable, for example, in packaging meat products. Preferred barrier layers include saran and ethylene vinyl alcohol copolymers (EVOH). The term saran is used in its normal commercial sense to contemplate polymers made for example by polymerizing vinylidene chloride and vinyl chloride or methyl acrylate. Additional monomers may be included as is well known. Vinylidene chloride polymers are the most commonly used, but other oxygen barrier materials are well known.

The fourth or outside layer is the abuse layer 16 or the layer which is exposed in use. This layer should provide abrasion resistance since in use in a packaging product, the outside layer rubs against the packaging carton or other bags and is the layer being handled in practice. Also, the outside layer should provide good optics and grease resistance.

However, when conventional materials are used as the outside layer, such as EVA or LLDPE, one frequently obtains applied seal delamination when the seal layer is heat sealed to form the final package. This represents delamination of the outside layer from the underlying barrier layer.

In accordance with the present invention, it has been found that applied seal delamination is eliminated or at least greatly minimized when the outside layer contains at least 25% by weight of a moisture curable polymer, and if desired as much as 100% of a moisture curable polymer. Preferred materials are silane grafted polyolefin polymers or copolymers, for example EAO, as LLDPE, or EVA grafted silane copolymers. The outside layer should contain at least 25% by weight of moisture curable polymer and preferably at least 40% by weight of the moisture curable polymer. Thus, for example, the outside layer can be a blend of two or more materials with at least 25% by weight of the moisture curable polymer and other materials, for example EAO, such as LLDPE, or EVA blended therewith.

The final laminate should preferably have a thickness of 1.5 to 3.5 mils, with preferred final thicknesses being in the range of 1.8 to 3 mils. The seal layer should preferably represent 10 to 30% of the thickness of the laminate, the core layer should represent the bulk of the laminate, generally 30 to 75% thereof, the barrier layer should represent less than 15% of the laminate as from 0.1 to 15% of the laminate, and the outside layer should represent less than 30% of the laminate, as from 0.5 to 30% of the laminate. In practice, the plastic materials are received in pellet form and extruded or coextruded into the laminate of the present invention by means well known in the art. Upon exposure to elevated temperatures, for example 175°–212° F. in the presence of water, the moisture curable polymer will crosslink or cure, substantially improving the properties thereof. In practice, the laminate is exposed to elevated temperatures in the presence of water in order to commence the crosslinking or curing process for the moisture curable polymer layer. Simple storage of the laminate under ambient conditions will continue the crosslinking process over for example a period of 1 to 3 weeks.

It may be desirable to include a tie layer or adhesive layer on one or both sides of the barrier layer. For example, one may utilize functionalized EVA copolymers with carboxylic acid or acid anhydride moieties grafted thereon, or high EVA with high VA content, e.g., 28% vinyl acetate comonomer in EVA copolymers. Generally, the adhesive layer is quite thin, as for example, 0.01 mils in a 2 mil laminate. Naturally, other layers may be included to obtain specific desired properties.

In the preparation of a packaging product, the laminate is preferably extruded or coextruded as a tubular film, solidified and crosslinked, as by irradiation. The irradiated tubular film is stretched biaxially and thus is biaxially oriented to improve the properties thereof.

Advantageously, the laminate of the present invention is preferably formed into packaging bags, as for example, bags for storing fresh meat. In the preferred process, the food product is inserted into the bag which is biaxially oriented. The bag is then evacuated and sealed about the food product.

The present invention and improvements resulting therefrom will be more readily understood from a consideration of the following illustrative examples.

EXAMPLE 1

In accordance with this example, 2 mil laminates were prepared as follows:

Laminate 1

Layer 1—inside seal layer—9% ethylene acrylic acid copolymer with 91% LDPE—0.29 mil.

Layer 2—core layer—EVA copolymer (15% VA)—1 mil.

Layer 3—barrier layer—VDC/methyl acrylate copolymer—0.2 mil.

Layer 4—adhesive tie layer—same as Layer 1—0.01 mil.

Layer 5—outside layer—0.5 mil.—blend of:
(a) 49% silane modified LLDPE,
(b) 49% LLDPE,
(c) 2% crosslinking initiator.

Laminate 2

Same as Laminate 1 except for Layer 5 which is as follows:
(a) 74% silane modified LLDPE.
(b) 24% EVA copolymer.
(c) 2% crosslinking initiator.

Laminate 3

Same as Laminate 1 except for Layer 5 which is as follows:
(a) 49% silane modified LLDPE.
(b) 49% EVA copolymer.
(c) 2% crosslinking initiator.

In all cases the, Layer 5 was 0.5 mil.

The laminate was prepared by coextruding layers 1 and 2 into a thick tape. The thick tape was irradiated followed by coextruded layers 3, 4 and 5 onto the thick tape. The resultant five layer laminate was quenched to room temperature in water and collected. The resultant thick tape having a final thickness of 24 mils was reheated in water in a hot bath to a temperature to about 200° F. A bubble was trapped in the tape and the tape was oriented to form the final product. The final product was then rolled and stored for several weeks. The hot water bath initiated crosslinking of the moisture curable polymer in the outside layer. Standing in storage continued the crosslinking or curing of the moisture curable polymer under ambient conditions. Several samples were tested after a two week storage period and it was found that crosslinking had taken place in the outside layer based on the percent gel content of the outside layer as indicated below. The gel results that are listed represent two replicate measurements. They reflect some of the inherent range of data that results from gel testing.

Laminate 1—% gel contents 1.36% and 10.42%.
Laminate 2—% gel contents 2.22% and 3.66%.
Laminate 3—% gel contents 7.04% and 1.43%.

In addition, a barrier bag was prepared by heat sealing the inside layers and applied seal delamination did not occur.

EXAMPLE 2

The procedure of Example 1 was repeated with the exception that the laminate was as follows:

Laminate 4
Layer 1—inside seal layer—9% ethylene acrylic acid copolymer with LDPE—0.29 mil.
Layer 2—core layer—15% EVA copolymer—1 mil.
Layer 3—barrier layer—PVDC methyl acrylate copolymer—0.2 mil.
Layer 4—adhesive tie layer—EVA copolymer—0.01 mil.
Layer 5—outside layer—blend of the following materials:
(a) 38% silane modified LLDPE.
(b) 4% crosslinking initiator.
(c) 58% EVA copolymer.

Laminate 5
Same as Laminate 4 except for layer 5 which is as follows:
(a) 58% silane modified LLDPE.
(b) 4% crosslinking initiator.
(c) 38% EVA copolymer.

Laminate 6
Same as Laminate 4 except for Layer 5 which is as follows:
(a) 38% silane modified LLDPE.
(b) 4% crosslinking initiator.
(c) 58% LLDPE.

Laminate 7
Same as Laminate 4 except for Layer 5 which is as follows:
(a) 58% silane modified LLDPE.
(b) 4% crosslinking initiator.
(c) 38% LLDPE.

The procedure was the same as for Example 1. After two weeks storage, the outside layer had crosslinked as indicated by the following % gel contents in the outside layer.

Laminate 4—18.6% gel
Laminate 5—35.5% gel
Laminate 6—19.6% gel
Laminate 7—32.1% gel The gel values typically represent the average of several sequential replicate measurements.

In addition, upon formation of a barrier bag by heat sealing of the seal layer, no applied seal layer delamination occurred from the outside to the saran layer.

The gel test results reflect the content of silane modified LLDPE, as well as the amount of crosslinking initiator present in each laminate.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A multilayer packaging laminate comprising:
   a) a cross-linked by irradiation, heat sealable plastic layer;
   b) a plastic oxygen barrier layer adhered to the heat sealable layer; and
   c) an outside layer of plastic material bonded to the oxygen barrier layer;
      wherein the abrasion resistant outside layer contains at least 25%, by weight of the outside layer, of a moisture curable polymer; and
      wherein the outside layer remains firmly adhered to the oxygen barrier layer when the heat sealable layer is sealed to form a package.

2. A laminate according to claim 1 including a plastic core layer between the heat sealable layer and oxygen barrier layer and adhered thereto.

3. A laminate according to claim 2 wherein the heat sealable layer is heat sealed to form a package.

4. A laminate according to claim 2 wherein the heat sealable layer is selected from the group consisting of ethylene vinyl acetate copolymer, low density polyethylene, and ethylene alpha olefin copolymer.

5. A laminate according to claim 2 wherein the core layer is selected from the group consisting of ethylene vinyl acetate copolymer, ethylene alpha olefin copolymer, nylon and polyester.

6. A laminate according to claim 5 wherein the oxygen barrier layer is selected from the group consisting of vinylidene chloride copolymer and ethylene vinyl alcohol copolymer.

7. A laminate according to claim 6 wherein the outside layer is selected from the group consisting of silane grafted ethylene alpha olefin copolymer and silane grafted ethylene vinyl acetate copolymer.

8. A laminate according to claim 7 having a thickness of 1.5 to 3.5 mils.

9. A laminate according to claim 8 wherein the heat sealable layer is 10 to 30% of the laminate, the core layer is 30 to 75% of the laminate, the oxygen barrier layer is 0.1 to 15% of the laminate and the outside layer is 0.5 to 30% of the laminate.

10. A laminate according to claim 1 wherein the layers are extruded.

11. A laminate according to claim 1 including an adhesive layer on at least one side of the oxygen barrier layer.

12. A laminate according to claim 1 wherein at least one of said layers are oriented.

13. A laminate according to claim 1 wherein the outside layer contains at least 40% by weight of moisture curable polymer.

14. A laminate according to claim 1 wherein the outside layer is blended with at least one of ethylene vinyl acetate copolymer, low density polyethylene and ethylene alpha olefin copolymer.

* * * * *

UNITED STATES PATENT AND TRADEMARK OFFICE
CERTIFICATE OF CORRECTION

PATENT NO. : 5,620,758
DATED : April 15, 1997
INVENTOR(S) : Robert Babrowicz

It is certified that error appears in the above-identified patent and that said Letters Patent is hereby corrected as shown below:

At Column 6, Claim 1 a) "a cross-linked by irradiation, heat sealable plastic layer" should read --a heat sealable plastic layer cross-linked by irradiation--

Signed and Sealed this

Twenty-sixth Day of August, 1997

Attest:

BRUCE LEHMAN

Attesting Officer

Commissioner of Patents and Trademarks